United States Patent [19]

Moshier et al.

[11] Patent Number: 5,031,497

[45] Date of Patent: Jul. 16, 1991

[54] BREAD SLICING MACHINE CLEANER

[75] Inventors: Mark W. Moshier, Manchester; Michael E. Leiweke, Arnold, both of Mo.

[73] Assignee: Continental Baking Company, St. Louis, Mo.

[21] Appl. No.: 373,940

[22] Filed: Jun. 29, 1989

[51] Int. Cl.[5] ............ B23D 55/00

[52] U.S. Cl. ............ 83/168; 83/807

[58] Field of Search ............ 83/168, 807, 803, 111

[56] References Cited

U.S. PATENT DOCUMENTS

| | | | |
|---|---|---|---|
| 1,870,774 | 8/1932 | Gaines . | |
| 1,872,656 | 8/1932 | Bleam . | |
| 1,908,727 | 5/1933 | Bleam . | |
| 2,167,939 | 8/1939 | Criner | 83/168 |
| 2,375,231 | 5/1945 | Kottmann | 83/168 |
| 2,423,363 | 7/1947 | Biro . | |
| 2,482,013 | 9/1949 | Marshall, Jr. | 83/168 |
| 2,525,004 | 10/1950 | Spang | 83/168 |
| 2,572,938 | 10/1951 | Lasar . | |
| 2,585,957 | 2/1952 | Meeker et al. . | |
| 2,664,923 | 1/1954 | Ferrari | 83/168 |
| 2,779,368 | 1/1957 | Lorimer et al. | 83/168 |
| 2,884,029 | 4/1959 | Bruch . | |
| 3,208,487 | 9/1965 | Aja . | |
| 3,220,446 | 11/1965 | Burkey | 83/168 |
| 3,295,400 | 1/1967 | Anderson | 83/661 |
| 4,274,389 | 6/1981 | White et al. | 83/168 |
| 4,312,253 | 1/1982 | Johnson et al. | 83/167 |
| 4,318,323 | 3/1982 | Voorhees et al. | 83/168 |
| 4,372,185 | 2/1983 | Pila | 83/101 |

FOREIGN PATENT DOCUMENTS

| | | | |
|---|---|---|---|
| 2802743 | 7/1979 | Fed. Rep. of Germany | 83/168 |

*Primary Examiner*—Hien H. Phan

*Attorney, Agent, or Firm*—Virgil B. Hill

[57] ABSTRACT

A cleaner for a band bread slicing machine, includes a plurality of band scraper units mounted on an elongated support rod. Each scraper unit includes a pair of fixed, resilient scraper blades positioned to engage the sides of a band blade of the slicer to guide and scrape the blade. A resilient scallop scraper blade is supported adjacent the resilient scraper blades. The scallop scraper engages a beveled or scalloped portion of the band blade. Actuators position the scraper units relative to the bands and move the scallop scraper into and out of engagement with the band.

11 Claims, 4 Drawing Sheets

BREAD SLICING MACHINE CLEANER

BACKGROUND OF THE INVENTION

The present invention relates to bread slicing machines, and more particularly to a cleaner or scraper assembly for a band slicer.

Heretofore, various machines have been developed for slicing bread prior to packaging. These machines include high volume band slicers and lower volume, reciprocating slicers. Band slicers include a pair of spaced drums and a plurality of bands which extend around the drums. The bands are positioned to slice a plurality of bread loaves passing through the slicer. A lattice work is provided to set the slice thickness. A reciprocating slicer includes a plurality of separate, reciprocating blades. Reciprocating slicers are of lower capacity. They are typically used in smaller bakery facilities or with low volume products.

Problems can be encountered with slicing various breads. Nonvariety breads, such as white, wheat and rye breads, may be efficiently sliced on high capacity band slicers. With variety breads, such as onion breads, raisin breads and fruit and nut breads, particulates will build up on the bands. When these breads are sliced, a micro thin coating of sugar adheres to the blades. Starch will adhere to the sugar, resulting in particulate build up. The particulate matter will collect between the bands and the drums and stall the machine. Heretofore, standard high capacity band slicers could not be used to slice variety breads.

At least one attempt to overcome the particulate build up problems has been made. The attempted solution uses a water spray to clean the bands and drums. This washing operation suffers from inherent problems including mold growth. A spray arrangement, therefore, is not an acceptable solution. As a result of these problems, low capacity reciprocating slicers are used to slice variety breads. Such inherently limits production.

A need exists, therefore, for an apparatus which will permit use of a high capacity band slicer with variety breads and which will eliminate the problems heretofore experienced with particulate build up and mold growth.

SUMMARY OF THE INVENTION

In accordance with the present invention, the aforementioned needs are fulfilled and the problems are solved. Essentially, a band slicer cleaner or scraper subassembly is provided which includes a plurality of scraper units. Each unit supports a pair of resilient, fixed scraper blades. A band is engaged by the scrapers to remove particulate build up.

A plurality of the units are mounted on a common support. Provision is made for moving the scraper units into and out of engagement with the individual band blades. In narrower aspects of the invention, a separate scraper is provided for the beveled edge of each band. The beveled edge scraper includes an angularly positioned scraper edge which is positioned in contact with the beveled surface of the band slicer. Provision is made for actuating the beveled surface scrapers of each of the individual units.

In a typical band slicer, a pair of the scraper subassemblies in accordance with the present invention are employed since the bands are wrapped around the drums in a figure eight configuration. The scraper blades effectively remove particulate matter from the blades and prevent starch and sugar build up. As a result, high capacity band slicers may be used with variety breads. Inherent production capacity limitations heretobefore experienced are eliminated.

DETAILED DESCRIPTION OF THE PREFERRED EMBODIMENT

Figure 1:
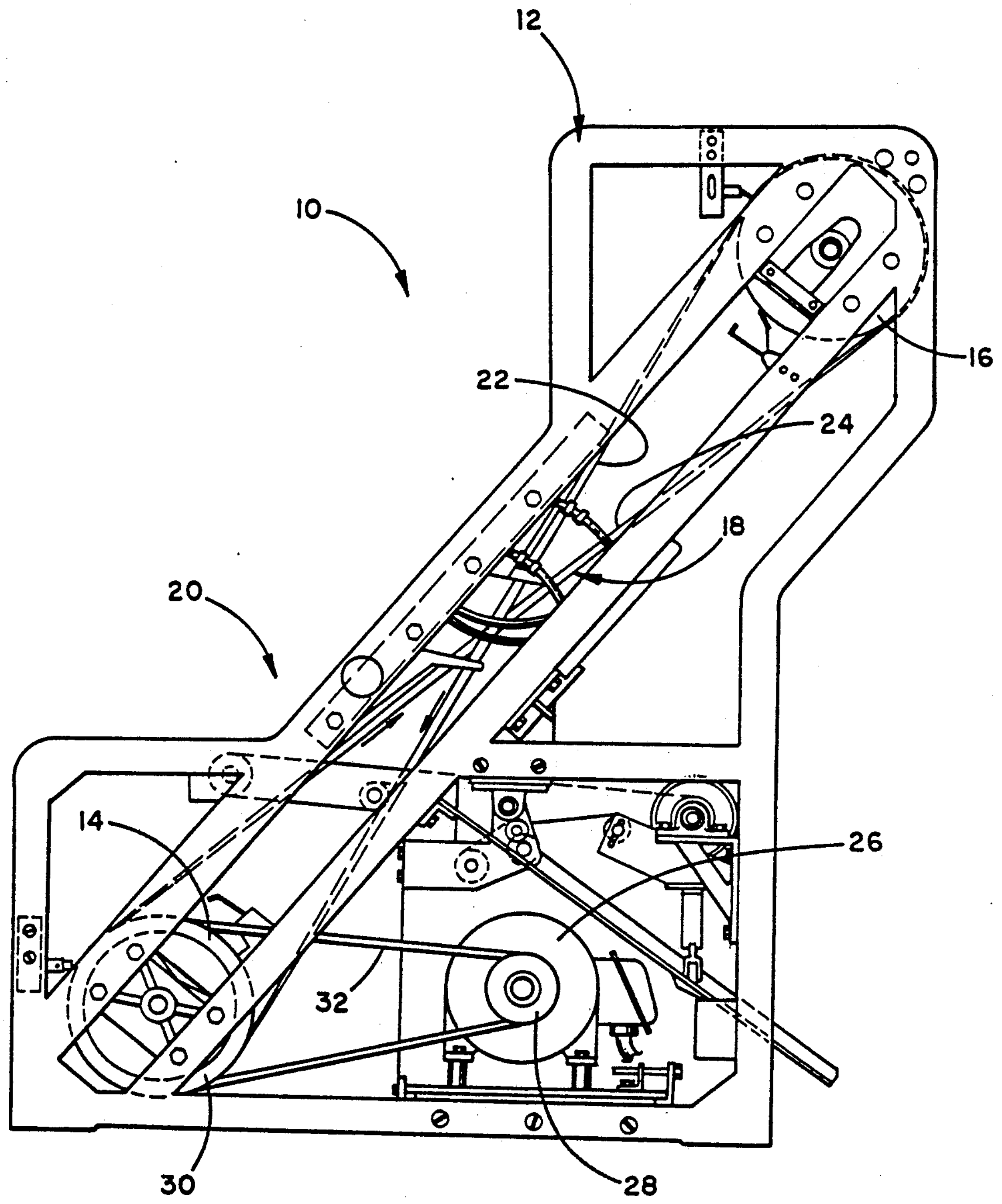
FIG. 1 is a side elevational view of a band bread slicer which incorporates the cleaner in accordance with the present invention.

One form of a band bread slicer is illustrated in FIG. 1 and generally designated by the numeral 10. Slicer 10 includes a frame 12. A lower drum 14 is rotatably mounted on the frame. An upper drum 16 is also rotatably mounted on frame 12 in spaced, parallel relationship to drum 14. Extending around drums 14, 16 in a figure eight configuration are a plurality of band blades 18. Each blade 18 is formed from a flexible steel band. Blades 18 lie in flat contact with drums 14, 16. Each blade is twisted as it passes a main bed portion 20 at which the bread loaves are sliced. Blade 18, therefore, defines a descending run 22 and an ascending run 24. A drive motor 26 is mounted on frame 12. Drive motor 26 includes an output shaft supporting a drive pulley 28. Pulley 28 is connected to a driven pulley 30 by drive belt 32. Slicer 10, in a conventional fashion, also includes a lattice work which sets slice thickness.

When a band slicer of the type illustrated in FIG. 1 is used to slice variety breads, such as onion breads, fruit breads, nut breads and the like, particulate build up occurs on the bands. A micro thin coating of sugar is formed on the band. This sugar coating attracts starch, resulting in significant build up problems. The build up materials migrate to the lattice work and to the drums. The build up between the blades and the drums causes the slicer to stall. White breads, wheat breads, rye breads and the like, do not present this problem.

Figure 2:
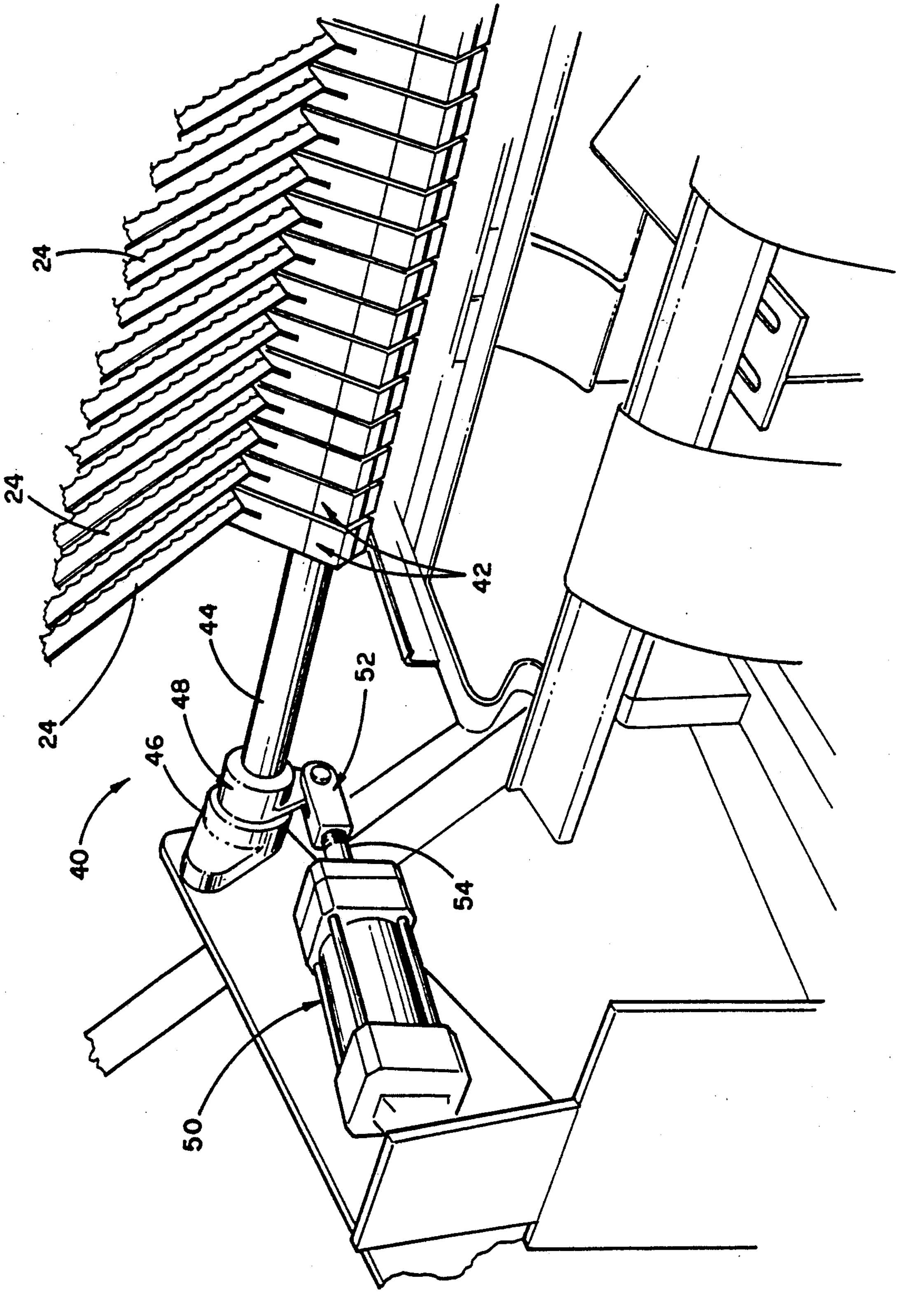
FIG. 2 is a greatly enlarged, fragmentary, perspective view of a portion of the band slicer and the cleaner in accordance with the present invention.
Figure 3:
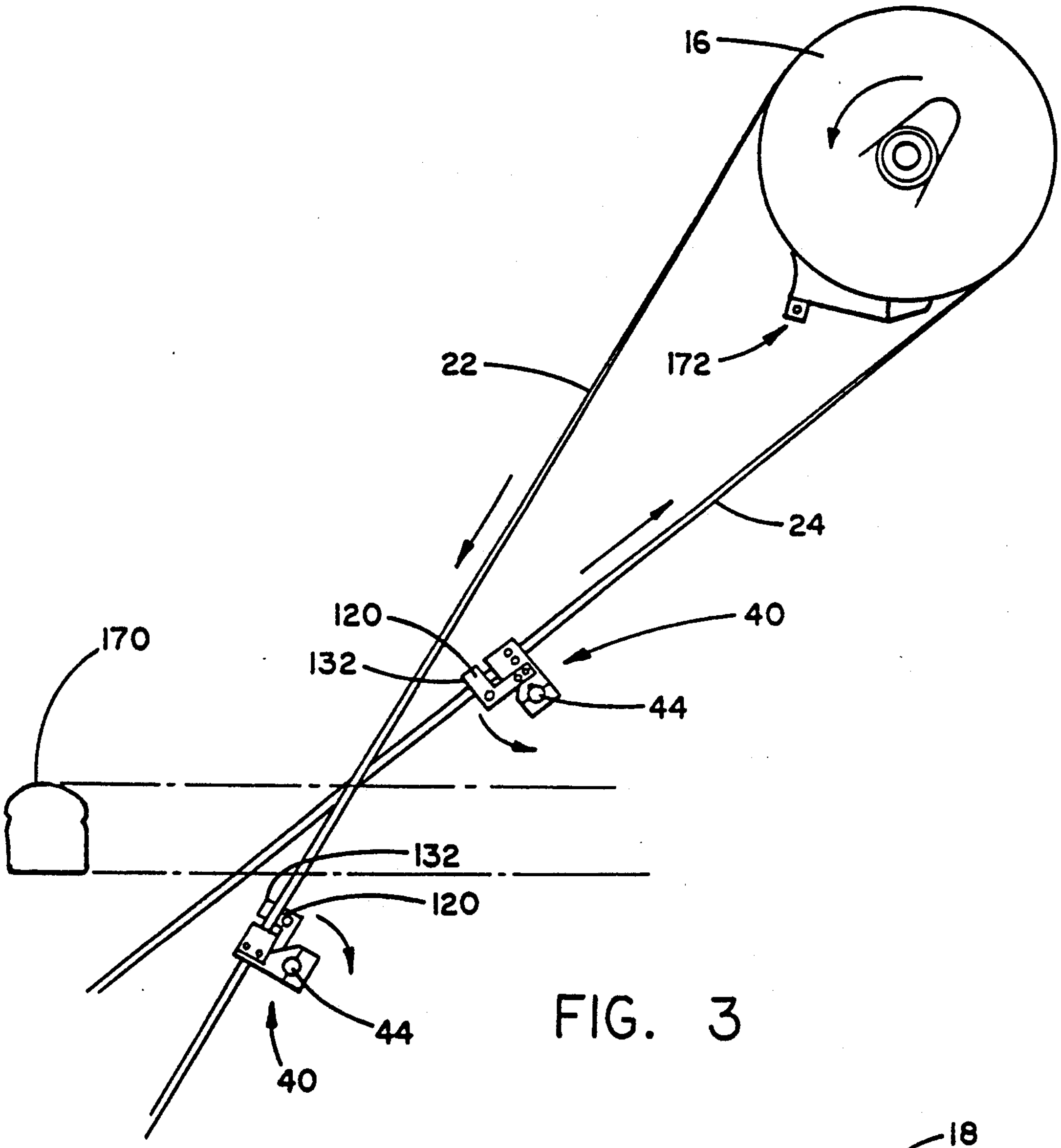
FIG. 3 is a fragmentary, schematic, elevational view showing the positioning of the cleaners in accordance with the present invention.

In accordance with the present invention, a cleaner subassembly, shown in FIGS. 2 and 3 and generally designated by the numeral 40, is provided. Subassembly 40 includes a plurality of the blade scraper units 42. Each scraper unit 42 is nonrotatably secured to a common mount or support rod or bar 44. The ends of bar 44 are rotatably supported in bearing assemblies 46, which are secured to frame 12 of slicer 10. An actuator lever 48 is nonrotatably secured to rod 44. Lever 48 is connected to a piston cylinder actuator 50 by a clevis 52. Retraction of a rod 54 of actuator 50 rotates rod 44 to move units 42 between inoperative and operative positions, as explained in more detail below.

Figure 4:
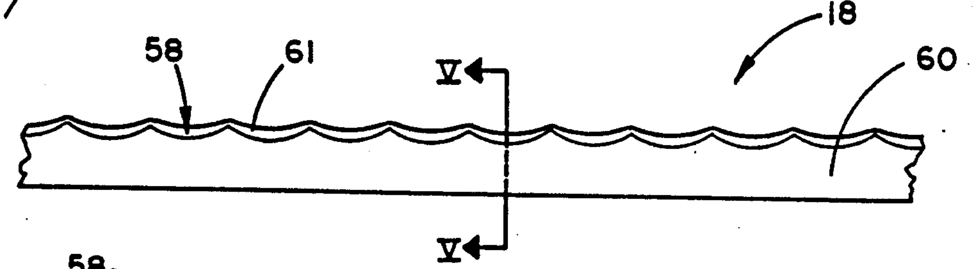
FIG. 4 is a side, elevational view of a band blade incorporated in the slicer of FIG. 1.
Figure 5:
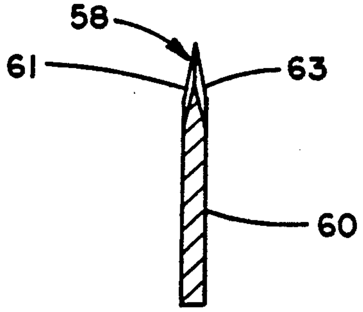
FIG. 5 is a cross-sectional view taken along line V—V of FIG. 4.
Figure 6:
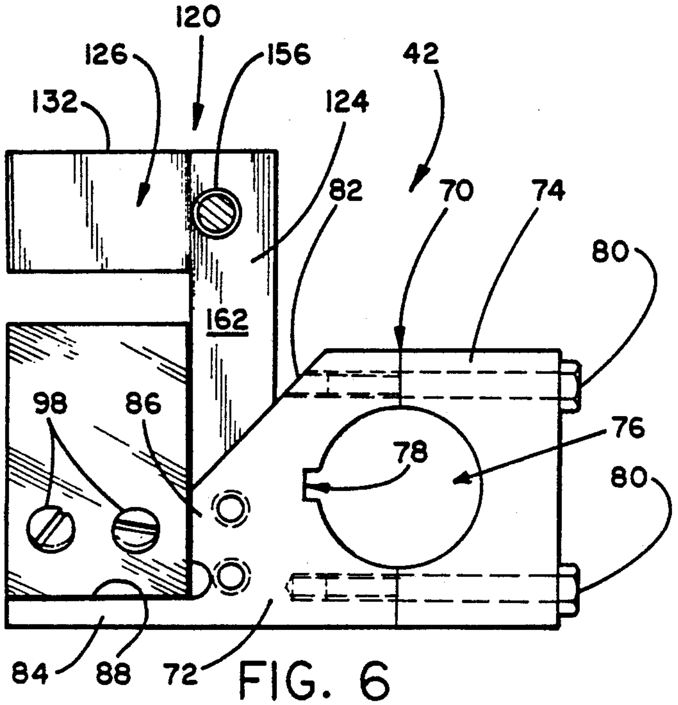
FIG. 6 is a side, elevational view of a scraper unit in accordance with the present invention.
Figure 9:
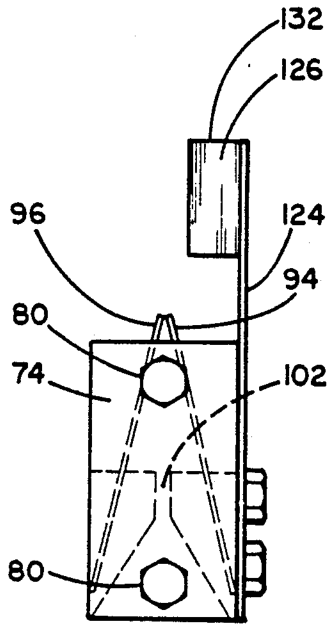
FIG. 9 is a rear, end elevational view of the scraper unit.
Figure 7:
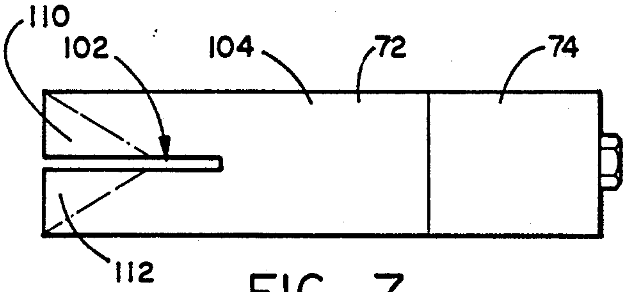
FIG. 7 is a bottom, plan view of the scraper unit.

A section of the band blade 18 is illustrated in FIGS. 4 and 5. As shown therein, blade 18 includes a beveled and scalloped cutting edge 58 joined to a main body portion 60. The blade is beveled on each side 61, 63. In accordance with the present invention, subassembly 40 scrapes both sides of main body portion 60 and one of the beveled edges or sides of band 18.

Each individual unit 42 is illustrated in detail in FIGS. 6–10. As shown therein, unit 42 includes a blade holder or mounting block 70. In the preferred form, block 70 is a two-piece member including a main support or holder portion 72 and a removable portion 74. Portions 72, 74 define a mounting bore or aperture 76 having a key slot 78. Portion 74 is secured to portion 72 by suitable fasteners 18. As a result, unit 42 may be mounted on the cylindrical rod 44 and keyed or nonrotatably fixed thereto.

Figure 10:
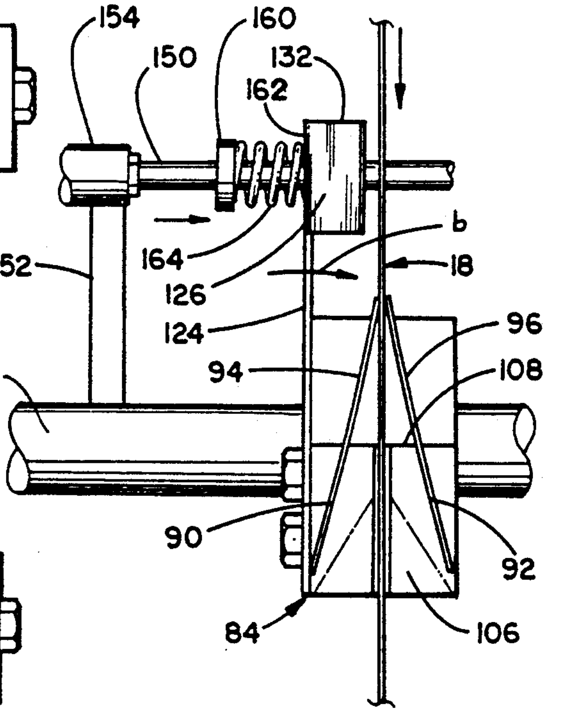
FIG. 10 is a front, end elevational view of the scraper unit including a portion of a band blade and showing a scallop scraper actuator.

Block portion 72 includes a sloped face 82 and a forward, nose portion 84. Nose portion 84 is grooved to define a shoulder 86 and a base ledge or shoulder 88. As seen in FIG. 10, opposite sides 90, 92 of nose portion 84 are angled, having a truncated V-shape in end elevation. A pair of resilient, generally rectangular scraper blades or members 94, 96 are fixed to nose portion 84 within the recess defined by shoulders 86, 88. Scraper blades 94, 96 are secured to block 72 by suitable fasteners 98.

Nose portion 84 defines a through slot 102. Slot 102 opens through bottom 104 of block 72, end 106 (FIG. 10) and top surface 108. Bottom 104 of block 72 at end 106 is beveled or "V" notched to define angled surfaces 110, 112. These surfaces act as a guide to position blade 18 within slot 102.

Figure 8:
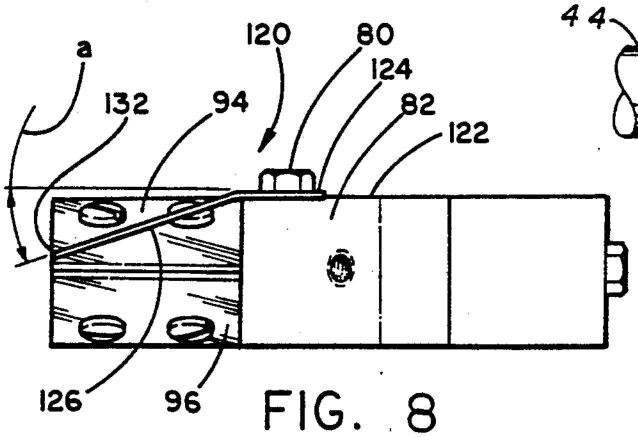
FIG. 8 is a top, plan view of the scraper unit.

A resilient beveled edge or scallop scraper blade 120 is fixed to a side 122 of block 72. Scraper 120 is generally L-shaped in plan and includes an elongated leg 124 and a short leg 126. As best seen in FIG. 8, leg 126 is angled from the plane of leg 124 to define an acute angle "a". In a presently existing embodiment, angle "a" is approximately six degrees. Scraper 120 is secured to block 72 by suitable fasteners 80 extending through a lower or free end of leg 124. Angled portion 126 of scraper 120 terminates in a scraping edge 132. Blades 94, 96 and 120 are made from resilient spring steel.

As illustrated in FIG. 10, provision is made for bending leg 124 of scraper 122 so that edge 132 will be selectively brought into contact with the beveled surfaces of blade 18. An elongated actuating rod 150 is mounted on support 44 by a bracket 152. Bracket 152 supports a piston cylinder actuator 154 which is connected to rod 150. Rod 150 is dimensioned to extend through an aperture 156 (FIG. 6) formed in each of the scrapers 120. Rod 150 extends through each of the scrapers 120 of each individual unit 22. A plurality of stops 160 are fixedly positioned on rod 150 adjacent each scraper 120. A spring 164 is positioned between each stop 160 and a face 162 of scraper leg 124. Spring 164 resiliently biases leg 124 away from stop 160. When actuator rod 150 is shifted to the right, as seen in FIG. 10, by actuator 154, spring 164 acting against leg 124 of scraper 120 resiliently biases edge 132 against blade 18. Scraper 132 will flex adjacent block 72. Spring 164 permits the blade to float against the beveled edge and follow the blade. Edge 132 of the scraper effectively removes particulate matter which collects on blade 18.

In preparing a conventional band slicer for use with variety breads, assemblies 40 are mounted above and below the plane where bread loaves 170 (FIG. 3) pass through the slicer. Units 42 are positioned so that each blade 18 is contacted and scraped after passing through the bread. The scallop or beveled edge scrapers 120 are positioned on each unit so that the beveled surface which would be adjacent or in contact with a respective drum 14, 16 is cleaned. As shown in FIG. 3, the upper subassembly 40 contacts run 24 after slicing the bread and before the band passes over drum 16. Band run 22 which passes downwardly through the bread is contacted by a lower subassembly 40.

In converting a conventional band slicer for use with variety breads, the individual subassemblies 40 are mounted on frame 12 as shown in FIG. 3. It is presently preferred that a plurality of spray nozzles be mounted adjacent the runs 22, 24 to periodically spray the bands with mineral oil. The mineral oil assists in the scraping operation by reducing build up. This reduces the amount of time that the scraper units must be used. Also, air jets may be positioned on frame 12 to remove material accumulated on the units. Lower driven drum 14 and also preferably upper drum 16, are coated with a wear resistant, nongrooving tungsten carbide coating. The tungsten carbide coating prevents the formation of grooves in the drums by the bands. This insures that drum scrapers 172 (FIG. 3) contacting upper and lower drums 14, 16 may effectively engage and scrape the surface of the drums. Should the wear resistant coating not be employed, grooves could form in the drums and the scraper would become ineffective. It is also preferred that the drive system of the conventional slicer be modified. A high torque drive is substituted for the conventional drive. A higher horsepower motor, such as a five horsepower motor, is substituted. The conventional belt drive is replaced by an HTD drive. Such a drive employs a geared drive belt and pulley arrangement similar to a sprocket and chain.

OPERATION

In operation, actuators 50 initially rotate rod 44 so that the individual units 42 are in a nonoperative position away from and out of contact with blades 18. Rotation of rod 44 then positions units 42 so that blades 18 extend through grooves 102. Blades 18 are contacted, scraped and guided by the resilient scraper blades 94, 96. To clean the beveled edge portions which will face drums 14, 16, actuator 154 shifts rod 150. Scraper blade 120 rotates or bends in the direction of arrow "b" (FIG. 10) to position scraping edge 132 against the beveled surface of blade 18. Edge 132 will float against the resilient bias of spring 164 when in contact with the blade. In addition, the mineral oiling system (not shown) may be actuated to assist in removal of particulate matter.

The band slicer cleaner in accordance with the present invention provides a mechanical solution to a relatively complex chemical problem. The particulate materials are effectively removed from the bands, and the slicer may now be used to slice a variety of breads. Mold problems associated with water cleaning sprays are completely eliminated. A significant economic advantage is achieved. Substantial throughputs are now achievable with variety breads. Production rates on the order of twice those achievable with reciprocating slicers may now be obtained with variety bread products. The significant investment in reciprocating slicers to run such breads may be avoided. Conventional blade slicers may be retrofitted with the cleaner subassemblies of the present invention at substantially less cost than that for the acquisition of a reciprocating slicer. The machines may process or slice different variety breads without machine shutdown for sanitation and cleaning purposes. The present invention, therefore, represents a significant advance in the art.

In view of the foregoing description, those of ordinary skill in the art may envision various modifications which would not depart from the inventive concepts disclosed herein. The above description should, therefore, be considered as only that of the preferred embodiment. The true spirit and scope of the present invention may be determined by reference to the appended claims.

The embodiments of the invention in which an exclusive property or privilege is claimed are defined as follows:

1. A scraper assembly for a bread band slicer, said assembly comprising:
 an elongated support rod;
 a plurality of blade scraper units nonrotatably fixed to said rod, each scraper unit including:
 a holder, said holder defining a front face, a rear face, spaced sides and an end, said holder further defining a slot opening through said faces and said end;
 a pair of fixed, resilient scraper blades, each blade being secured to one of said sides of said holder, said blades having free ends which are adjacent each other so that a band saw blade passing through said slot is engaged by the free ends of said blades;
 a scallop scraper fixed to said holder, said scallop scraper including a free end spaced from said free ends of said fixed scraper blades, said scallop scraper having a generally L-shaped configuration including an elongated leg fixed to said mounting block and a scraper portion defining an edge, said scraper portion extending at an angle from the plane of said elongated leg so that the edge of said scraper portion will contact a beveled cutting edge of a band blade; and
 a scallop scraper actuator engaging said scallop scrapers for selectively moving the edges of each of said scraper portions into engagement with a band blade.

2. A scraper assembly as defined by claim 1 wherein said scallop scraper actuator comprises:
 an elongated actuator rod;
 means engaging said actuator rod for shifting said rod;
 a stop fixed to said actuator rod; and
 spring means engaging said stop and said scallop scraper for resiliently biasing said scallop scraper into engagement with the blade.

3. A scraper assembly as defined by claim 1 wherein said scallop actuator comprises:
 an acutator member;
 resilient means on said member connecting said member to said scallop scrapers of said scraper units; and
 means connected to said actuator member for shifting said member.

4. A scraper assembly as defined by claim 3 wherein said resilient means comprises:
 a stop; and
 a spring positioned between and engaging said stop and said scallop scraper.

5. A scraper assembly as defined by claim 4 wherein said scallop scraper defines an aperture and wherein said actuator member extends through said aperture.

6. A scraper assembly as defined by claim 5 wherein said sides of said block angle towards each other from said front face.

7. An apparatus for cleaning a band blade of a bread slicer, the slicer being of the type which as a pair of drums and a plurality of bank blades extending around said drums, each blade including a beveled edge, said apparatus comprising:
 an elongated mount;
 a plurality of scraper subassemblies fixed to said mount for engaging and scraping each band blade;
 drive means operatively connected to said mount for moving said mount and said subassemblies relative to the band blades between operative and inoperative positions and wherein each of said scraper subassemblies includes a holder, said holder defining a slot extending therethrough and a pair of resilient scraper blades fixed to said holder adjacent said slot to engage and scrape a band blade passing therethrough;
 bevel scraper means on said mounting bar for engaging and scraping the beveled edge of the band blade; and
 actuator means operatively connected to said bevel scraper means for selectively moving said bevel scraper means into an operating position when said scraper subassemblies are in their operating positions.

8. An apparatus for cleaning a band blade of a bread slicer, the slicer being of the type which as a pair of drums and a plurality of bank blades extending around said drums, each blade including a beveled edge, said apparatus comprising:
 an elongated mount;
 a plurality of scraper subassemblies fixed to said mount for engaging and scraping each band blade;
 drive means operatively connected to said mount for moving said mount and said subassemblies relative to the band blades between operative and inoperative positions and wherein each of said scraper subassemblies includes a holder, said holder defining a slot extending therethrough and a pair of resilient scraper blades fixed to said holder adjacent said slot to engage and scrape a band blade passing therethrough;
 bevel scraper means on said mounting bar for engaging and scraping the beveled edge of the band blade, said bevel scraper means comprising a plurality of bevel scraper blades, each bevel scraper blade being secured to one of said holders and defining an angled portion having an edge; and
 actuator means operatively connected to said bevel scraper means for selectively moving said bevel scraper means into an operating position when said scraper subassemblies are in their operating positions.

9. An apparatus as defined by claim 8 wherein said actuator means comprises:
 an elongated rod;
 coupling means on the rod for coupling the rod to each of said bevel scraper blades; and shifting means connected to said rod for shifting said rod to thereby move said bevel scraper blades to their operating positions.

10. An apparatus as defined by claim 9 wherein said bevel scraper blades are formed from a resilient material and each defines an actuator aperture through which said rod passes.

11. An apparatus as defined by claim 10 wherein said coupling means comprises:

a stop on said rod; and a spring positioned between and engaging said stop and said bevel scraper blade.

* * * * *